(12) United States Patent
Bartels et al.

(10) Patent No.: US 9,126,286 B2
(45) Date of Patent: Sep. 8, 2015

(54) LASER CLADDING OF TUBES

(75) Inventors: Florian Bartels, Markdorf (DE);
Aravind Jonnalagadda, Farmington Hills, MI (US); Michael Wiener, Plymouth, MI (US); Eric Stiles, Pittsfield Township, MI (US)

(73) Assignee: Fraunhofer USA, Plymouth, MI (US)

( * ) Notice: Subject to any disclaimer, the term of this patent is extended or adjusted under 35 U.S.C. 154(b) by 669 days.

(21) Appl. No.: 13/136,740

(22) Filed: Aug. 9, 2011

(65) Prior Publication Data

US 2011/0297083 A1   Dec. 8, 2011

Related U.S. Application Data

(62) Division of application No. 12/154,235, filed on May 21, 2008, now abandoned.

(51) Int. Cl.

| | |
|---|---|
| *B23K 26/34* | (2014.01) |
| *B23K 26/14* | (2014.01) |
| *B23K 26/02* | (2014.01) |
| *B23K 26/08* | (2014.01) |
| *C23C 24/10* | (2006.01) |
| *B23K 26/32* | (2014.01) |

(52) U.S. Cl.
CPC .............. *B23K 26/34* (2013.01); *B23K 26/02* (2013.01); *B23K 26/0823* (2013.01); *B23K 26/0869* (2013.01); *B23K 26/147* (2013.01); *B23K 26/1411* (2013.01); *B23K 26/3206* (2013.01); *B23K 26/345* (2013.01); *C23C 24/10* (2013.01); *B23K 2201/06* (2013.01)

(58) Field of Classification Search
CPC .............................. B23K 26/345; C23C 24/10
USPC ................................................. 118/317, 641
See application file for complete search history.

(56) References Cited

U.S. PATENT DOCUMENTS

| | | |
|---|---|---|
| 5,179,260 A | 1/1993 | Kroehnert |
| 5,196,272 A | 3/1993 | Morishige et al. |
| 5,242,438 A * | 9/1993 | Saadatmanesh et al. ....... 606/15 |
| 5,387,292 A | 2/1995 | Morishige et al. |
| 5,426,278 A | 6/1995 | Hirano et al. |
| 5,430,270 A | 7/1995 | Findlan et al. |
| 5,496,422 A | 3/1996 | Morishige et al. |
| 5,653,897 A | 8/1997 | Findlan et al. |
| 5,656,185 A | 8/1997 | Findlan et al. |

(Continued)

*Primary Examiner* — Dah-Wei D Yuan
*Assistant Examiner* — Stephen Kitt
(74) *Attorney, Agent, or Firm* — Butzel Long (57) ABSTRACT

The present invention relates to an apparatus for laser cladding of a curved surface comprising: (a) an elongated arm having first and second ends and defining a chamber through the arm from the first end to the second end; (b) a laser delivery source connected to a focusing lens mounted in a housing within an opening on the first end of the arm for delivering a laser beam through the chamber; (c) a delivery head mounted on the second end of the arm comprised of (i) an enclosure having an inlet for receiving the laser and an outlet for delivering the laser to the curved surface, (ii) a powder nozzle for delivering a cladding powder to an inner surface of the curved surface, and (iii) a reflective surface for reflecting the laser to exit through the outlet; (d) mounting means for rotating the curved surface for the cladding of the curved surface; and (e) indexing means for moving the arm substantially parallel to a longitudinal axis of the curved surface so as to clad the curved surface during the rotation of the curved surface. Typically, the curved surface is part of the inner surface of a tube used in industrial applications.

14 Claims, 7 Drawing Sheets

(56) References Cited

U.S. PATENT DOCUMENTS

| | | | |
|---|---|---|---|
| 6,299,707 B1 * | 10/2001 | McCay et al. | 219/121.82 |
| 6,303,897 B1 * | 10/2001 | Bady et al. | 219/121.65 |
| 6,316,744 B1 | 11/2001 | Nowotny et al. | |
| 6,548,125 B2 | 4/2003 | Warnecke | |
| 6,858,262 B2 | 2/2005 | Fischer et al. | |
| 6,881,451 B2 | 4/2005 | Heinemann et al. | |
| 2007/0056939 A1 | 3/2007 | Colby et al. | |
| 2007/0071907 A1 | 3/2007 | Stiles et al. | |

* cited by examiner

FIG. 10

LASER CLADDING OF TUBES

CROSS-REFERENCE TO RELATED APPLICATIONS

This application is a division of U.S. application Ser. No. 12/154,235, filed May 21, 2008, now abandoned which is incorporated herein by reference in its entirety.

STATEMENT REGARDING FEDERALLY SPONSORED RESEARCH OR DEVELOPMENT

Not Applicable.

REFERENCE TO A "COMPUTER LISTING APPENDIX SUBMITTED ON A COMPACT DISC"

Not Applicable.

BACKGROUND OF THE INVENTION (1) Field of the Invention

The present invention relates generally to an apparatus and a process for laser coating of the inner diameter of tubes.

(2) Description of the Related Art

Industrial coating or cladding of tubes is well known. In the oil and drilling industry, tubes of various sizes often demand inner diameter coating, welding or cladding with a desired material. Lasers have been utilized as a coating process by melting the coating material with the desired surface to generate a "melt pool" which subsequently hardens.

Laser welding of the inner diameter (ID) of barrels involves the depositing of a liner material prior to welding in the form of paste or powder, or a separate liner tube. In the alternative, during this welding process a powder or continuous wire is applied to the surface receiving the lining. The laser welder usually includes a laser beam delivered from a remote source via fiber optics and optical systems, or by direct laser beams.

Several systems to laser clad the inner surface of pipes have been developed and commercialized. These include U.S. Pat. Nos. 5,196,272; 5,387,292, 5,426,278, 5,496,422, 5,653,897, and 5,656,185. These systems are designed to repair damaged or corroded heat exchanger tubes in power generation plants. This is done by making short, localized repairs in relatively long, fixed pipes that cannot rotate. Each of these systems uses a rotating laser head for welding.

The systems described in the aforementioned patents include the insertion of a cladding or inlay material by any of a wire, powder, paste, or thin wall tube. The paste and the tubes must already be in place before the laser cladding operation. Powder is difficult to introduce in the vertical position without gravity assist since it tends to clog and interrupt the cladding process.

U.S. Patent Application No. 2007/0056939 to Colby et al.; U.S. Pat. No. 6,881,451 to Heinemann et al.; U.S. Pat. No. 6,858,262 to Fischer et al. and U.S. Pat. No. 6,548,125 to Warnecke, each describe inventions related to powder coating using lasers. U.S. Patent Application No. 2007/0056939 application describes laser cladding of tubes at very high revolution speeds, 100-10,000 rpm. Particularly, this application is related to liners on plasticating barrels. U.S. Pat. No. 6,881,451 describes laser coating the internal surface of a piston of an internal combustion engine by rotating the laser within the piston. U.S. Pat. No. 6,858,262 describes laser coating of a cylinder by displacing the laser and powder apparatus axially along the cylinder. U.S. Pat. No. 6,548,125 describes laser coating of a barrel of a weapon by moving the laser axially within the barrel.

For prolonged or full-length cladding of longer pipes, the head and especially the reflecting mirrors associated with a particular laser cladding apparatus must be cooled. This can be done using a cooling fluid such as air or water. Many of the previously described devices must have auxiliary services introduced from the laser head end of the tube because access from the opposite end is not available, and cannot be coordinated with the activity provided from the laser end. These auxiliary services can include a fiber optical viewer, wire/powder feeds, cooling media, optics (lenses) and focusing devices. Moreover, many of the known devices weld on constantly changing surfaces. This tends to give a non-uniform and less smooth surface due to the influence of gravity. If the cladding is done with the pipe in a vertical position, the melt pool tends to not be flattened and can have exaggerated rings or other distortions in the surface. There is no natural tendency to flatten or smooth the surface in a uniform manner.

U.S. Pat. No. 5,430,270 issued to Findlan et al. describes a method and apparatus for repairing damaged tubes using a laser welding technique. Particularly, this process describes clad welding and repair of the internal surface of a tube. The technique uses the addition of filler metal to build up the internal surface of the tube. A laser energy source is connected to an elongated weld head by an optical fiber. The weld head is rotatable and contains a mirror canted at a forty-five (45) degree angle. As the weld head rotates, the laser beam travels circumferentially around the inner surface of the tube. Metal fill material is fed to the location where the focused laser beam contacts the surface of the tube.

U.S. Pat. No. 5,179,260 issued to Kroehnert relates to a process and device for laser welding of a tube. Particularly, the device is constructed to prevent the laser from reflecting from the surface of contact back into the welding head causing thermal dysfunction and stress on the internal welding head components. Melted material from the welding process often reflects back onto the mirror of reflection and other components in close proximity. By using a reflected surface constructed to deflect the laser beam to a focal point at an oblique angle, the life and usage of the device is significantly increased.

Cladding head technology is known in the art. U.S. Patent Application 2007/0071907 to Stiles et al. describes a process for hard coating of ferrous metal substrates using a laser beam with diamond particles in a metal matrix produced from precursor powders of metals which bond to the diamond particles and to the ferrous substrate. The process utilizes a cladding head for delivering the laser beam. U.S. Pat. No. 6,316,744 to Nowotny et al. describes a machining head and a process for the surface machining of workpieces by means of a laser beam, in which coating, alloying in the area close to the surface or dispersion of a peripheral zone of the base material with powder particles can be carried out using a pulverulent filler supplied. Both references are incorporated by reference herein in their entirety.

Despite efforts to date, a need remains for an efficient and effective laser welding device and process for coating and/or cladding the inner surface of tubes. Particularly, a need exists for a programmable device that facilitates desired overlap of the cladding material. Still further, a need exists for easily replaceable parts and significant reduction of reflection of melted material back onto the optical components of a welding apparatus.

Objects

Therefore, it is an object of the present invention to provide an improved apparatus and process for laser coating/cladding of the inner surface of tubes.

SUMMARY OF THE INVENTION

The present disclosure provides for an apparatus for laser cladding of a curved surface comprising: (a) an elongated arm having first and second ends and defining a chamber through the arm from the first end to the second end; (b) a laser delivery source connected to a focusing lens mounted in a housing within an opening on the first end of the arm for delivering a laser beam through the chamber; (c) a delivery head mounted on the second end of the arm comprised of (i) an enclosure having an inlet for receiving the laser and an outlet as a laser nozzle for delivering the laser to the curved surface, (ii) a diffuser nozzle for delivering a cladding powder to an inner surface of the curved surface, and (iii) a reflective surface for reflecting the laser to exit through the outlet; (d) mounting means for rotating the curved surface for the cladding of the curved surface; and (e) indexing means for moving the arm substantially parallel to a longitudinal axis of the curved surface so as to clad the curved surface during the rotation of the curved surface. In an exemplary embodiment, the curved surface is at least a portion of an inner surface of a tube. The reflective surface can be selected from group consisting of a mirror, copper, and fused silica coated with anti-reflective coating. The diffuser is operable to deliver the cladding powder and a carrier gas to the curved surface. The powder and carrier gas are each fed from an external powder source and a carrier gas source respectively through and along a powder/gas pathway defined in the elongated arm and exit through the diffuser nozzle. The diffuser is adapted to allow for the carrier gas to be delivered in excess to reduce powder velocity.

In an exemplary embodiment, the elongated arm further defines water channels in the chamber operable to allow for water cooling of the focusing lens and maintaining the operating temperature of the cladding head between 25 and 50° C. Typically, the apparatus comprises a cover glass adjacent the laser nozzle in the housing adapted to reduce dust and back-spatter resulting from the cladding. In a particular embodiment, the reflective surface and the cover glass are each removably mounted within the housing. The elongated arm defines a shield gas pathway running parallel to a longitudinal axis of the elongated arm sized for allowing shield gas to be delivered to the laser nozzle. The laser nozzle defines a small slit sized to increase shield gas velocity. The shield gas is operable to reduce back-spatter velocity entering the laser nozzle. In a further exemplary embodiment, the apparatus comprises a temperature sensor in the head for temperature monitoring of the laser cladding. Further still, the apparatus may further comprise a thermal switch adapted to turn off the laser when the temperature in the housing rises above the set point.

In an exemplary embodiment, the curved surface is adapted to be rotated and the apparatus is adapted to be indexed parallel to a longitudinal axis of the curved surface and movement of each of the curved surface and the apparatus with respect to each other is preset to achieve a predetermined cladding thickness. The preset movement of each of the curved surface and the elongated arm is controlled by a programmable robotic source. The apparatus is operable for cladding overlapping from 40 to 50% of a previous cladding and deposits a thickness from 0.15 mm to 3 mm onto the inner surface of the tube. In a further embodiment, the cladding powder is 60-40 Tungsten carbide and Nickel based powder. The delivery head can be constructed from a member selected from the group consisting of copper, copper-beryllium alloy and combinations thereof.

The present disclosure provides for a process for laser cladding, which comprises: (a) providing an apparatus for laser cladding the inner diameter of a curved surface which comprises: (1) an elongated arm having first and second ends and defining a chamber through the arm from the first end to the second end; (2). a laser delivery source connected to a focusing lens mounted in a housing within an opening on the first end of the arm for delivering a laser beam through the chamber; (3) a delivery head mounted on the second end of the arm comprised of: (i) an enclosure having an inlet for receiving the laser and an outlet as a laser nozzle for delivering the laser to the curved surface; (ii) a diffuser nozzle for delivering a cladding powder to an inner surface of the curved surface, and (iii) a reflective surface for reflecting the laser to exit through the outlet; (4) mounting means for rotating the curved surface for the cladding of the curved surface; (5) indexing means for moving the arm substantially parallel to a longitudinal axis of the curved surface so as to clad the curved surface during the rotation of the curved surface; and (b) cladding the curved surface by indexing the elongated arm to coat the curved surface with the cladding.

In an exemplary embodiment, the curved surface is at least a portion of an inner surface of a tube. The cladding powder and a carrier gas are delivered to the curved surface from the diffuser. The powder and the carrier gas can each be fed from an external powder source and carrier gas source respectively through and along a powder/gas pathway defined in the elongated arm and exit through the diffuser nozzle. The carrier gas is delivered in excess operable to reduce powder velocity. In a particular embodiment, the apparatus further comprises a cover glass adjacent the laser nozzle in the housing adapted to reduce dust and back-spatter resulting from the cladding. The reflective surface and the cover glass can each be removably mounted within the housing. In a further embodiment, a shield gas passes from the first end to the second end of the elongated arm and exits through a small slit defined in the laser nozzle and adapted to increase gas velocity. The shield gas is operable to reduce back-spatter velocity in the laser nozzle. Still further, the delivery head comprises a temperature sensor in the head for temperature monitoring of the laser cladding. Even further still, the delivery head further comprises a thermal switch adapted to turn off the laser when the temperature in the housing rises above a set point. In a further embodiment, the present disclosure provides for a process comprising rotating the curved surface and indexing the apparatus parallel with a longitudinal axis of the curved surface. The movement of each of the curved surface and the apparatus with respect to each other is preset to achieve a predetermined cladding thickness. The preset movement of each of the curved surface and the elongated arm can be controlled by a programmable robotic source.

The present disclosure provides for a cladding head apparatus adapted for laser cladding of a surface comprising: (a) an enclosure having an inlet for receiving a laser and an outlet as a laser nozzle for delivering the laser to the surface, (b) a diffuser mounted adjacent to the enclosure having a diffuser nozzle for delivering a cladding powder to the surface; (c) a reflective surface for reflecting the laser to exit through the outlet; and (d) a cover glass within the enclosure mounted adjacent to the laser nozzle for reducing dust and back spatter resulting from the cladding of the surface. The cover glass and the reflective surface are each removably mounted within the enclosure. The cladding head can be mounted on a second end of an elongated arm defining a chamber and coupled to a laser energy source at an opposite first end. The chamber is constructed to allow for the laser to be transmitted through the elongated arm and into the inlet of the enclosure of the cladding head. The reflective surface can be adapted to reflect the laser perpendicular to a longitudinal axis defined by the elongated arm. In an exemplary embodiment, each of the cover glass and the reflective surface is mounted on a removable insert member such that each of the cover glass and the reflective surface is replaceable. The reflective surface is selected from group consisting of a mirror, copper, and fused silica coated with anti-reflective coating.

In an exemplary embodiment, the diffuser is operable to deliver the cladding powder and a carrier gas to the surface. The powder and carrier gas are each fed from an external powder source and a carrier gas source respectively and exit through the diffuser nozzle. In a further embodiment, the apparatus comprises shield gas delivery means for delivering shield gas to the laser nozzle. The laser nozzle defines a small slit sized to increase shield gas velocity. The shield gas is operable to reduce back-spatter velocity entering the laser nozzle. The apparatus can further comprise a temperature sensor mounted in the enclosure for temperature monitoring of the laser cladding. Still further, the apparatus can comprise a thermal switch adapted to turn off the laser when the temperature in the housing rises above the set point.

DESCRIPTION OF THE PREFERRED EMBODIMENTS

The present disclosure provides for an apparatus for laser cladding of a curved surface. Particularly, the present disclosure relates to an apparatus and process for laser cladding of the inner surface of a tube. In an exemplary embodiment, a laser cladding apparatus comprises: (a) an elongated arm having first and second ends and defining a chamber through the arm from the first end to the second end; (b) a laser delivery source connected to a focusing lens mounted in a housing within an opening on the first end of the arm for delivering a laser beam through the chamber; (c) a delivery head mounted on the second end of the arm comprised of (i) an enclosure having an inlet for receiving the laser and an outlet for delivering the laser to the curved surface, (ii) a powder nozzle for delivering a cladding powder to an inner surface of the curved surface, and (iii) a reflective surface for reflecting the laser to exit through the outlet; (d) mounting means for rotating the curved surface for the cladding of the curved surface; and (e) indexing means for moving the arm substantially parallel to a longitudinal axis of the curved surface so as to clad the curved surface during the rotation of the curved surface. The curved surface can be the inner surface of a tube. Typically, the tube rotates and the apparatus indexes along the longitudinal axis within the tube and movement with respect to each other is preset to achieve a predetermined cladding thickness. The longitudinal movement and rotation of the tube can be programmed to effectuate a desired cladding thickness and/or overlap of the cladding material.

In an exemplary embodiment, the reflective surface is selected from group consisting of a mirror, copper, and fused silica. The fused silica can be coated with anti-reflective coating for the laser wavelength to reduce heat absorption. Typically the cladding powder and the carrier gas are fed from a diffuser, through and along the elongated arm and exit through the powder nozzle. The focusing lens is cooled by water channels running inside the elongated arm. A cover glass is positioned adjacent the nozzle in the housing and is adapted to prevent dust and spatter resulting from the cladding process to contaminate the mirror. A shield gas passing from the first end to the second end of the elongated arm and exiting through a small slit defined on the outlet of the housing can be utilized and adapted to reduce spatter velocity. This is accomplished through the slit which is adapted to increase gas velocity. Typically, the shield gas exits through an elongated nozzle tip adapted to protect against random spatter and streamline the shield gas perpendicular to the plane of cover glass. The gas exiting the nozzle tip through the slit perpendicular to the cover glass is adapted to reduce spatter velocity entering the nozzle.

In an exemplary embodiment, the head is maintained at a predetermined temperature by water cooling passing through a water input channel from the first end of the elongated arm through the head. The apparatus can further comprise a temperature sensor in the head for real time monitoring of the laser cladding. Accordingly, a thermal switch for detecting a rise in temperature above a predetermined set point can be employed. The switch is adapted to turn off the laser when the temperature in the housing rises above the set point.

In a particular embodiment, the mirror and the cover glass are each removably mounted within the housing. Thus, the apparatus is constructed to allow for easy and convenient removal, cleaning, and replacement of individual components, typically related to the optical mechanisms (i.e., the mirror, the cover glass, etc.).

Mounting means for rotating the curved surface can be a machine constructed to hold and rotate the curved surface. In a particular embodiment, when the curved surface is part of a tube, the mounting means can be a machine constructed to hold and rotate a tube, particularly a tube used in industrial applications such as oil drilling. Indexing means for moving the arm substantially parallel to a longitudinal axis of the curved surface can be any robotic arm or data input control machine. For example, the elongated arm can be mounted on a robotic arm which is coupled to a computer and in electronic communication with the computer. The computer can be programmed to index the elongated arm along the longitudinal axis to achieve a desired cladding thickness. Shield gas delivery means for delivering shield gas to the laser nozzle can be a pressurized gas source (i.e., pressurized tank or gas line) operable to deliver gas at a desired velocity to the laser nozzle. In an exemplary design, the shield gas enters a pathway defined in the chamber of the elongated arm near a first end and exits at the laser nozzle. The shield gas and the carrier gas are preferably Argon however; they can be any suitable inert gas including helium and nitrogen. Nitrogen is effective in selective cladding cases when properties like surface nitriding are desired.

An exemplary embodiment of a laser cladding apparatus according to the present disclosure is illustrated with respect to FIGS. 1-8. Apparatus 10 is comprised of an elongated arm 11 connected to a cladding head 20 at a first end 11'. Elongated arm 11 is typically constructed from aluminum; however, other suitable metals are appropriate. Extending from a second end 11" of arm 11 is an attachment base 13 adapted to securely connect with a collimator 30. Base 13 can be referred to as a housing 13 adapted to receive a laser energy source. Collimator 30 is adapted to deliver a laser through a chamber defined inside elongated arm 11 and is coupled to a laser energy source (not shown). A focusing lens 31 is typically mounted on a front portion 30' of collimator 30 and securely fits within base 13. Elongated arm 11 defines an opening at second end 11" for receiving the laser energy source. A laser beam is delivered from collimator 30 focused through focusing lens 31 and then delivered through an internal pathway 14 defined inside elongated arm 11. Focusing lens 31 defines a relatively long focal length (i.e., adapted to focus the laser across pathway 14). Pathway 14 continues through cladding head 20 and turns at a right angle into perpendicular portion 14'. Pathway 14 exits apparatus 10 through an opening 23 defined on a laser nozzle 15 of head 20. Pathway 14 is substantially parallel with respect to a longitudinal axis defined by elongated arm 11. Pathway 14 continues through to a perpendicular portion 14' which is perpendicular with respect to the longitudinal axis of pathway 14.

Cladding head 20 is comprised of a laser head 21 mounted adjacent diffuser head 22. In an exemplary embodiment, laser head 21 is constructed from copper. Other suitable materials for constructing laser head 21 include, copper-beryllium alloy for additional toughness. Diffuser head 22 is adapted to deliver a powdered cladding material to the desired surface T. Diffuser 22 can also be referred to as a powder diffuser and comprises a diffuser nozzle 40. Cladding head 20 and includes internal components mounted within laser head 21 comprised of reflecting surface 24 and cover glass 26. Reflecting surface 24 is adapted to reflect laser L to exit through opening 23. In exemplary embodiment, reflecting surface 24 is a mirror and is adapted to reflect laser beam L perpendicular to the longitudinal axis defined by elongated arm 11. Reflecting surface 24 can be any member from the group consisting of a mirror, copper and fused silica. The fused silica is coated with an anti-reflective (AR) coating to reduce heat absorption generated from the laser. Typically, reflecting surface 24 is positioned at a 45° angle with respect to the longitudinal axis of the elongated arm 11. In a further embodiment, reflecting surface 24 is mounted on a removable insert 25. Removable insert 25 as shown in FIGS. 3-6 and 8 allows for convenient replacement and cleaning of the reflecting surface. Thus, the life of the apparatus can be prolonged by simply removing and/or cleaning individual parts rather than replacing the entire apparatus. In a further embodiment, cover glass 26 is mounted on a removable sliding insert 27 (also referred to as a removable slide). Cover glass 26 is adapted to protect reflecting surface 24 from dust and spatter from the cladding process.

A laser beam L travels down pathway 14 and reflects off of reflection surface 24 to continue through perpendicular portion 14' exiting through opening 23 and contacting an exemplary surface T. Laser L contacts surface T after reflecting from a reflecting surface 24 generating a melt pool on surface T. Cladding material such as powder P is delivered to the melt pool through diffuser head 22. This allows for build-up/cladding of surface T. The powder material is delivered from an external powder source called a powder feeder coupled to diffuser 22. The powder feeder also delivers a carrier gas with the powder. Diffuser 22 releases excessive carrier gas through diffuser nozzle 40 thereby reducing powder velocity. Reduced powder velocity facilitates good cladding characteristics and higher powder utilization. The powder exits diffuser 22 through diffuser nozzle 40 and reaches the melt pool on surface T thus forming additional deposit build-up on surface T. Laser energy generates heat thereby undesirably heating certain components such as focusing lens 31. Focusing lens 31 is thus cooled by water channels 32 (see FIGS. 2 and 6) running inside elongated arm 11.

A particular undesired consequence of most cladding processes is dust and back spatter generated during the cladding process. The spatter due to cladding is found to frequently damage cover glass 26. As shown with respect to FIGS. 2, 3 and 5, a shield gas channel 33 is defined in elongated arm 11. Shield gas channel 33 inputs into elongated arm 11 at a first end 33' defined in base 13. Laser L exits laser head 21 through a laser nozzle 15. Laser nozzle 15 is substantially conically shaped defining a narrow opening 23. The shield gas passes through shield gas channel 33 and exits through laser nozzle 15 through a narrow slit 34. Narrow slit is constructed to increase the velocity of the shield gas as it exits head 20. The increase in velocity of the gas exiting coaxially to the laser contributes to reducing back spatter velocity during cladding. This provides at least some protection for cover glass 26. In an exemplary embodiment, the shield gas enters the cladding head 20 at high pressure (i.e., 30-60 Psi) and relatively low velocity. Due to the area constriction (i.e, slit 34), the velocity of the shield gas increases while the pressure drops. The relatively high velocity in shield gas is utilized to counter back spatter. The gas leaving the nozzle will have lower velocity than that which exits the narrow slit 34. If the gas were exiting the nozzle at higher velocity, it may interfere with the cladding powder distribution resulting in poor powder efficiency. Additionally laser nozzle 15 is formed to provide additional protection for cover glass 26 from random spatter.

Laser energy generates heat thereby undesirably heating certain components. Due to relatively high back reflection and high heat inside the elongated arm during laser use, effective water cooling is employed. The internal components of apparatus 10 are water cooled by water flowing through water channels 32 (see FIGS. 2 and 6) running inside elongated arm 11. It is desirable to maintain a constant temperature inside cladding head 20 which is accomplished through water cooling. Water enters elongated arm 11 at either end of the elongated arm and exits through the opposite end.

According to an exemplary embodiment, an optional temperature sensor (i.e., a thermocouple) is mounted inside laser head 21 at a mounting hole 60. Hole 60 is typically positioned between the reflecting surface and the cover glass. In an exemplary embodiment, hole 60 houses a cylindrical pin shaped thermal switch. The switch can open the circuit when the temperature rises about a specified set point. In a further embodiment, a temperature sensor can be coupled to a temperature cut-off switch thereby shutting down operation of apparatus 10 when the temperature reaches an undesired or dangerous level. The temperature cut-off switch can also be mounted in hole 60 along with the thermocouple. The temperature sensor can further serve as real time health monitoring, particularly related to the health of the internal components. For example, a sudden rise in temperature may indicate a damaged reflection surface 24 or cover glass 26. The thermal switch can be inserted into head 20 and made operable to detect rises in temperature above a set point resulting in turning off apparatus 10 in case of an emergency or failure. Typically the thermal sensor is a thermocouple. In an exemplary embodiment, the thermocouple is connected to a hand held display module for monitoring internal environment. In an exemplary embodiment, the thermal switch is made operable to shut down the laser when the internal the cladding head temperature exceed 90-100° C. Typically the thermocouple and the thermal switch are separate mechanical parts each constructed to achieve a separate task (i.e., thermocouple is made to measure temperature and the thermal switch is designed to cutoff the laser). In a further exemplary embodiment, the thermocouple and the thermal switch are constructed as a single unit to be installed into the cladding head. The single unit may include electronic feedback to shut down the laser in case of emergency.

Figure 1:
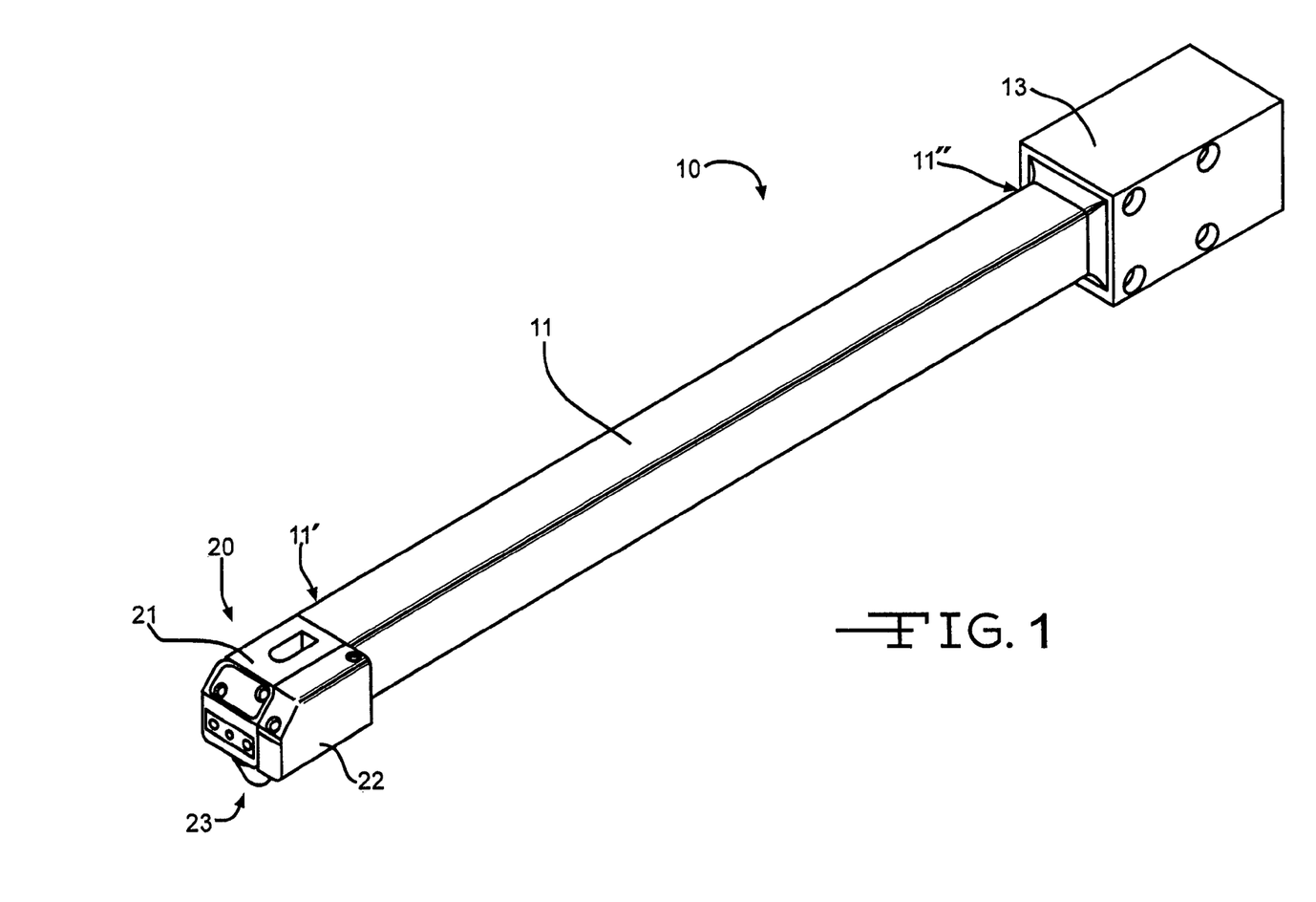
FIG. 1 illustrates an overall construction of an exemplary cladding apparatus according to the present disclosure.
Figure 2:
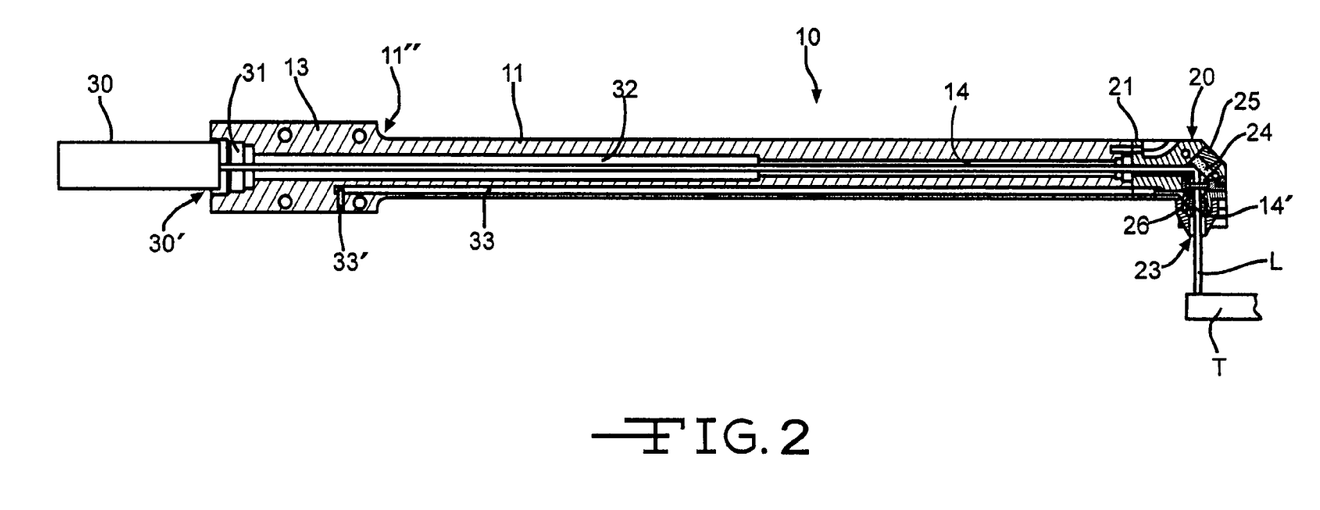
FIG. 2 illustrates a side and cross section view of the cladding apparatus of FIG. 1.
Figure 3:
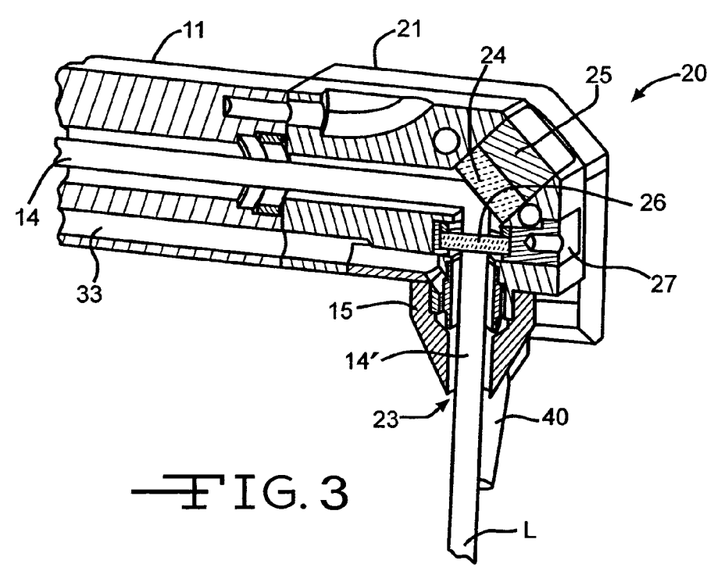
FIG. 3 illustrates a cross section view of the cladding head of FIG. 1.
Figure 4:
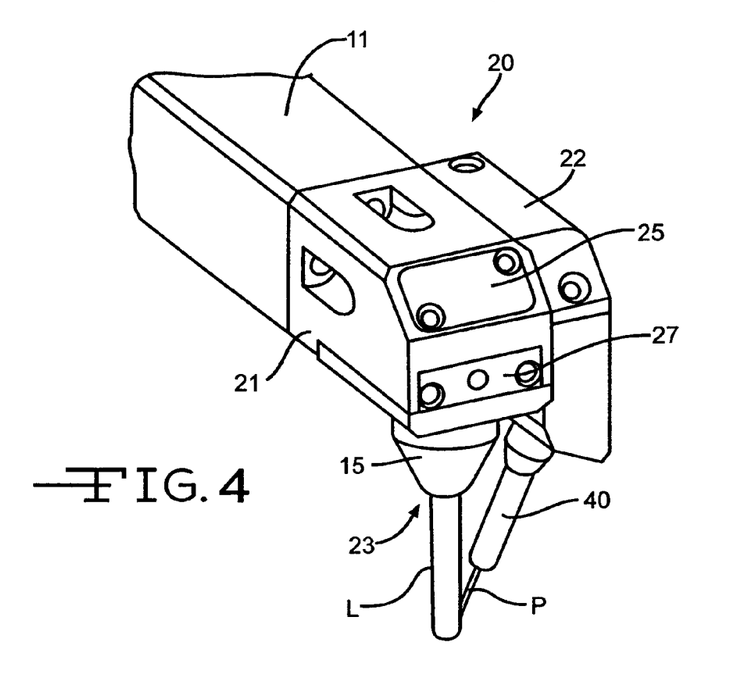
FIG. 4 illustrates a perspective front view of the cladding head of FIG. 1.
Figure 5:
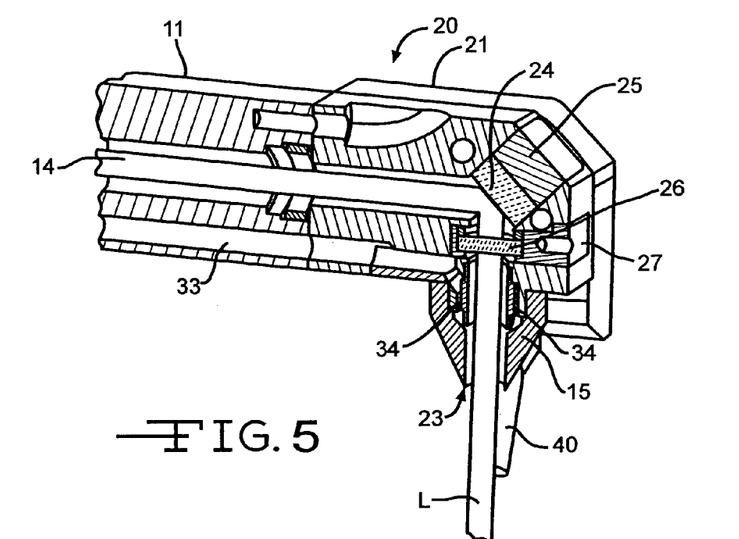
FIG. 5 illustrates a cross section view of the cladding head of FIG. 1.
Figure 6:
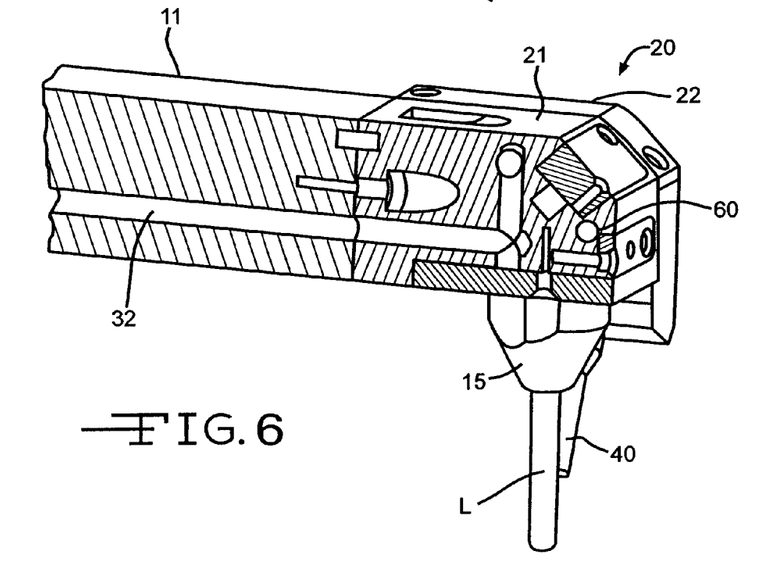
FIG. 6 illustrates a cross section view of the cladding head of FIG. 1 showing the cooling water channel.
Figure 7:
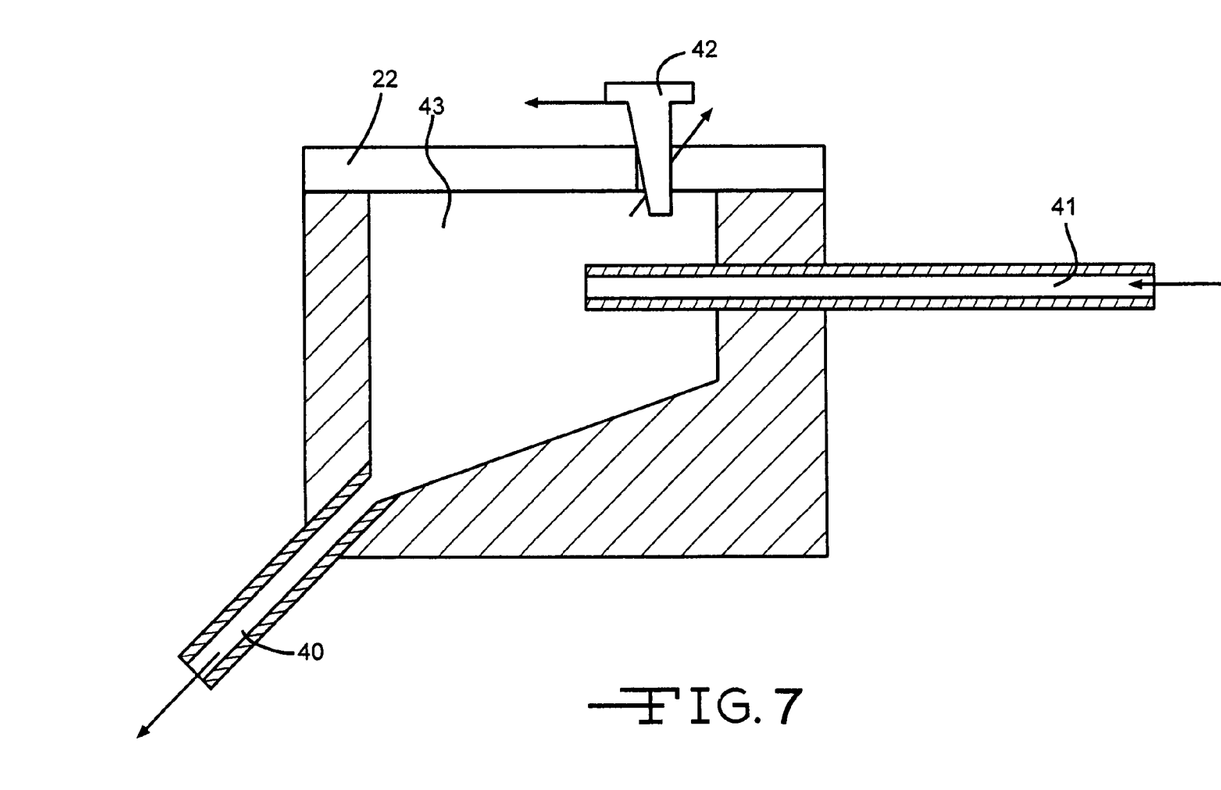
FIG. 7 illustrates a schematic cross section view of the diffuser of FIG. 1.
Figure 8:
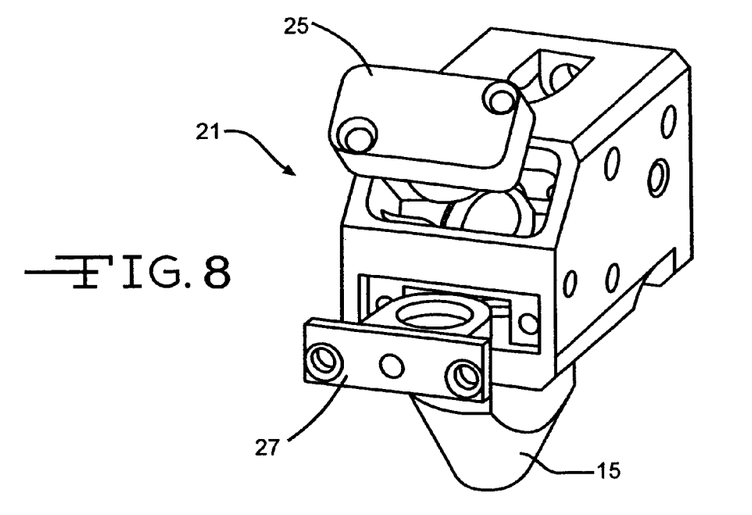
FIG. 8 illustrates an exploded view of the replaceable components of the cladding head of FIG. 1.

As previously described, exemplary powder for cladding is supplied from an external device known as a powder feeder. The powder feeder feeds the powder along with the carrier gas at a relatively high velocity. A high velocity powder when delivered into the melt pool created by the laser may result in poor cladding characteristics. Thus, reducing powder velocity is desired and achieved by releasing excessive carrier gas causing the powder to drop into the process by gravity. With reference to FIG. 7, Powder/carrier gas is supplied into the diffuser through a powder/gas pathway 41. Diffuser 22 defines an internal cavity 43 where the carrier gas and the powder are supplied before exiting through powder nozzle 40. A tapered screw 42 is provided as a gas relief mechanism. Turning the tapered screw inwardly reduces the gas release and turning the screw outwardly increases gas release. Nozzle 40 is elongated and can be referred to as a nozzle tip. The elongated configuration allows for streamlining the shield gas perpendicularly to the shield gas.

Powder is carried by the carrier gas to the cladding location surface. If too little carrier gas is used, the powder settles down in the tubes as the carrier gas does not have enough force to push the powder to the process. Accordingly, a sufficient pressure and gas volume on the carrier gas is needed to properly transfer the powder to the process. However, if the carrier gas pressures and flow rates tend to "blow away the melt pool" indicating excessive volumes of carrier gas, then the gas relief releases the excessive carrier gas resulting in optimal powder velocity and hence good cladding characteristics.

Figure 9:
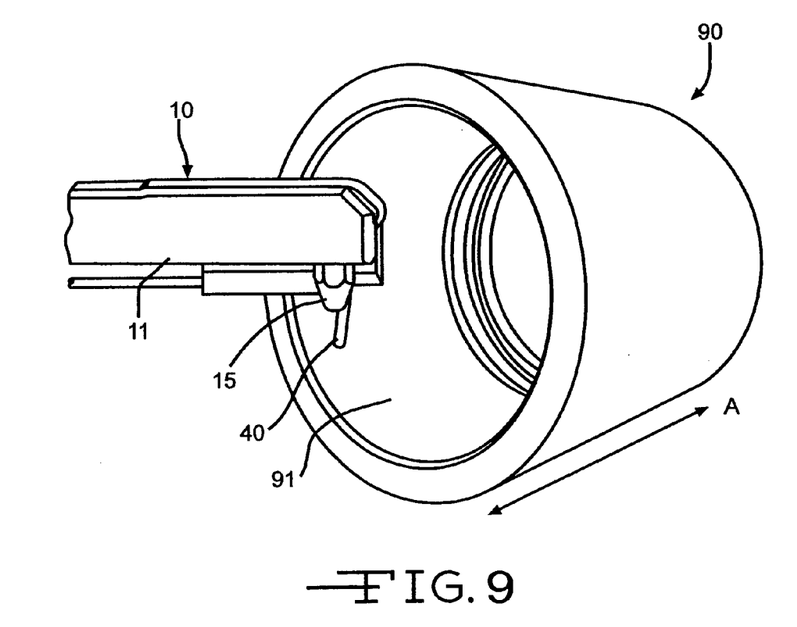
FIG. 9 illustrates an exemplary cladding apparatus with an industrial tube intended to receive the cladding process.

With respect to FIG. 9, an exemplary apparatus 10 is shown about to be inserted into an exemplary tube 90. Tube 90 is an annular cylinder having inner surface 91. Apparatus 10 is inserted into tube 90 with cladding head 20 substantially facing downward towards surface 91. In an exemplary embodiment, tube 90 is being rotated allowing apparatus 10 to clad surface 91 without apparatus 10 rotating within the tube. Still further, apparatus 10 can be coupled with a robotic or programmable system that translates apparatus 10 axially along a longitudinal axis A of tube 90. Apparatus can be indexed by the programmable system. In an exemplary embodiment, apparatus 10 is capable of build-up welding, repair, and/or hard-facing inside tubes. In a further exemplary embodiment, apparatus 10 is operable for cladding of tubes of four inches diameter and higher. It is conceived that cladding of tubes of 2.5 inches diameter is achievable. The laser can be a diode or a YAG laser. In an exemplary embodiment, cladding is performed at powers of up to 3.0 kW and 5.0 kW using diode/YAG laser.

Typically, tube 90 is being rotated by a mounting means. The mounting means is typically a three jaw chuck and operates to mount tube 90 and cause it to rotate about the cladding apparatus. The three jaw chuck (not shown) typically holds tube 90 at one end while the other end is open for the cladding head to be inserted therein. The chuck rotates tube 90 as the cladding procedure proceeds. The revolution speed of the tube is typically dependent upon the diameter of the tube. In an exemplary embodiment, the cladding circumferential speed (i.e., speed in which the lading is deposited around the inner circumference of the tube) is fixed and depends on laser power and thickness requirement. Accordingly, for example, for 3 kW laser power, the cladding speed varies from 900 mm/min to 1500 mm/min which varies based on desired thickness. Lower speeds yield thicker coatings and vice versa. For example: For 1.5 mm thick cladding, a cladding circumferential speed of 1100 mm/min is suitable. For a tube with an inner diameter of 4 inch (101.6 mm) to maintain a cladding speed of 1100 mm/min, the tube would have to rotate at approximately 3.4 revolutions per minute (RPM).

Cladding of the inner surface of the tubes as the tube rotates allows for desired overlap of the cladding material. In a particular embodiment, the cladding overlaps from 40 to 50% of a previous cladding and deposits a thickness from 0.15 mm to 3 mm onto the inner surface of the tube. In an exemplary embodiment, the cladding powder is 60-40 Tungsten carbide and Nickel based powder. It is understood that 60-40 tungsten carbide-nickel base means 60% tungsten carbide by weight and 40% nickel based matrix. The welding head is typically being cooled and should be operating at a temperature of between 25 and 50° C. The elongated arm can be constructed from a metal. The delivery head can be constructed from a member selected from the group consisting of copper, copper-beryllium alloy and combinations thereof. In an exemplary embodiment, such as use in oil drilling industry, a 2 mm pitch (overlap) is employed to achieve a coating thickness of 1.5 mm. Depending on the diameter of the laser beam, different spot sizes are achieved. In a particular embodiment, the spot size is between 4.5 mm to 9 mm.

The following example procedure is being made to more clearly illustrate the present disclosure and is not intended to imply limitations to such embodiments. Accordingly, it should be understood that variations are within the intended scope of the present disclosure.

Example

Figure 10:
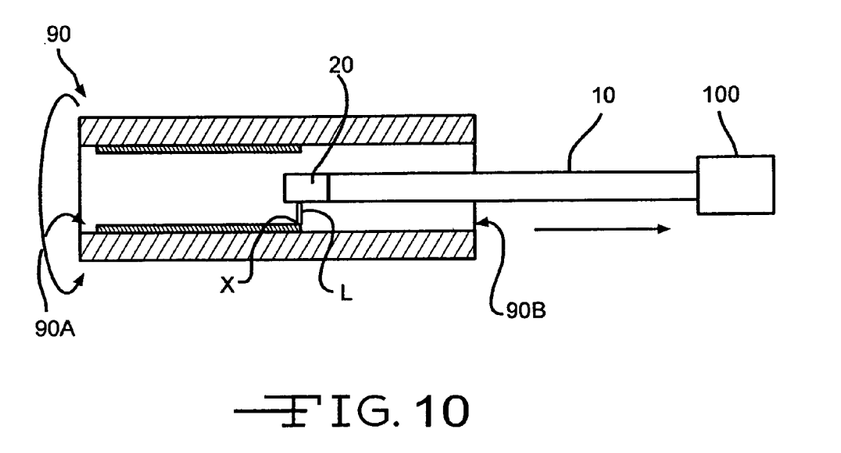
FIG. 10 illustrates an exemplary schematic of a cladding apparatus performing cladding on a tube.

In an exemplary embodiment as shown in FIG. 10, apparatus 10 can be attached to either a robot arm or any Computer Numerical Control (CNC) machine represented schematically by box 100. Tube 90 is held in a chuck (not shown). The robot/CNC 100 is programmed to allow the cladding head 20 to travel inside the tube to the required spot X. Robot/CNC 100 is programmed to switch on the powder feeder for 15 seconds prior to laser start. This time lag allows the powder to reach a stable feed rate. The program turns ON the laser while simultaneously turning tube 90 (i.e., rotating the tube continuously). Tube 90 turns 180° while apparatus 10 remains at the same position. Apparatus 10 is then moved out of the tube along tube 90's longitudinal axis while tube 90 rotates. This creates a spiral cladding motion. The linear motion of apparatus 10 and the rotation of tube 90 are programmed so that the pitch remains constant. For example: To obtain 2 mm pitch, the head has to move linearly by 2 mm for every 360 deg of tube rotation. As the cladding progresses, heat inside the tube increases substantially. To reduce the heat impact on cladding head 20, apparatus 10 is positioned deep inside tube 90 at the start up (i.e., cladding head 20 is positioned at first end 90A at the startup of the cladding process). Apparatus 10 moves longitudinally from first end 90A to second end 90 B as the cladding progresses.

Parameters of the cladding process can be determined as follows:

A cladding thickness requirement is provided. Accordingly the following basic cladding parameters are then established: Power; Cladding travel velocity; Pitch/overlap; and Powder feed rate.

In an exemplary embodiment the process travel speed is started at low 900 mm/min and the powder input to the process is increased till desired thickness is achieved. The pitch is at 40-60% of the laser spot size. Next the travel speed is increased in small increments (i.e., 100 mm/min). Increasing the travel speed typically demands higher powder input to keep the thickness constant. Hence the powder feed rate is increased successively. Beyond certain travel speed, the laser does not have enough energy to melt the substrate and the powder. As a result the coating starts to delaminate (chip off). The cross section of such layer shows occasional de-bonding of the layer. This shows that the critical limit for travel speed and the powder feed rate are reached. Speed is slightly reduced when the cladding trials are performed. The cladding region can be cut and analyzed. A suitable cladding track shows no signs of delamination. The determined travel speed and the powder feed rates are utilized for cladding.

While the present invention is described herein with reference to illustrated embodiments, it should be understood that the invention is not limited hereto. Those having ordinary skill in the art and access to the teachings herein will recognize additional modifications and embodiments within the scope thereof. Accordingly, such modifications and/or embodiments are considered to be included within the scope of the present invention.

What is claimed:

1. An apparatus for laser cladding of a curved surface comprising:
    (a) an elongated arm having first and second ends and defining a chamber through the arm from the first end to the second end;
    (b) a laser delivery source connected to a focusing lens mounted in a housing within an opening on the first end of the arm for delivering a laser beam through the chamber;
    (c) a delivery head mounted on the second end of the arm comprised of (i) an enclosure having an inlet for receiving the laser and an outlet as a laser nozzle for delivering the laser to the curved surface, (ii) a diffuser nozzle for delivering a cladding powder to an inner surface of the curved surface, and (iii) a reflective surface for reflecting the laser to exit through the outlet;
    (d) mounting means for rotating the curved surface for the cladding of the curved surface; and
    (e) indexing means configured for moving the arm parallel to a longitudinal axis of the curved surface without rotation of the diffuser nozzle and with the diffuser nozzle substantially facing downwardly toward the curved surface, so as to clad the curved surface during the rotation of the curved surface;
    wherein the diffuser is operable to deliver the cladding powder and a carrier gas to the curved surface, and wherein the powder and carrier gas are each fed from an external powder source and a carrier gas source respectively through and along a powder/gas pathway defined in the elongated arm and exit through the diffuser nozzle, wherein the diffuser is adapted to release excess carrier gas to reduce powder velocity.

2. The apparatus of claim 1 wherein, the curved surface is at least a portion of an inner surface of a tube.

3. The apparatus of claim 1, wherein the reflective surface is selected from the group consisting of a mirror, copper, and fused silica coated with anti-reflective coating.

4. The apparatus of claim 1, wherein the elongated arm further defines water channels in the chamber operable to allow for water cooling of the focusing lens and maintaining the operating temperature of the cladding head between 25 and 50° C.

5. The apparatus of claim 1, further comprising a cover glass adjacent the laser nozzle in the housing adapted to reduce dust and back-spatter resulting from the cladding.

6. The apparatus of claim 5, wherein the reflective surface and the cover glass are each removably mounted within the housing.

7. The apparatus of claim 5, wherein: (i) the elongated arm further defines a shield gas pathway running parallel to a longitudinal axis of the elongated arm sized for allowing shield gas to be delivered to the laser nozzle; (ii) the laser nozzle defines a small slit sized to increase shield gas velocity; and (iii) the shield gas is operable to reduce back-spatter velocity entering the laser nozzle.

8. The apparatus of claim 1, further comprising a temperature sensor in the head for temperature monitoring of the laser cladding.

9. The apparatus of claim 1, further comprising a thermal switch adapted to turn off the laser when the temperature in the housing rises above a set point.

10. The apparatus of claim 1, wherein the curved surface is adapted to be rotated and the apparatus is adapted to be indexed parallel to a longitudinal axis of the curved surface and movement of each of the curved surface and the apparatus with respect to each other is preset to achieve a predetermined cladding thickness.

11. The apparatus of claim 10, wherein the preset movement of each of the curved surface and the elongated arm is controlled by a programmable robotic source.

12. The apparatus of claim 1, wherein the apparatus is operable for cladding overlapping from 40 to 50% of a previous cladding and deposits a thickness from 0.15 mm to 3 mm onto the curved surface.

13. The apparatus of claim 1, wherein the cladding powder is 60-40 Tungsten carbide and Nickel based powder.

14. The apparatus of claim 1, wherein the delivery head is constructed from a member selected from the group consisting of copper, copper-beryllium alloy and combinations thereof.

* * * * *